Patented Oct. 13, 1925.

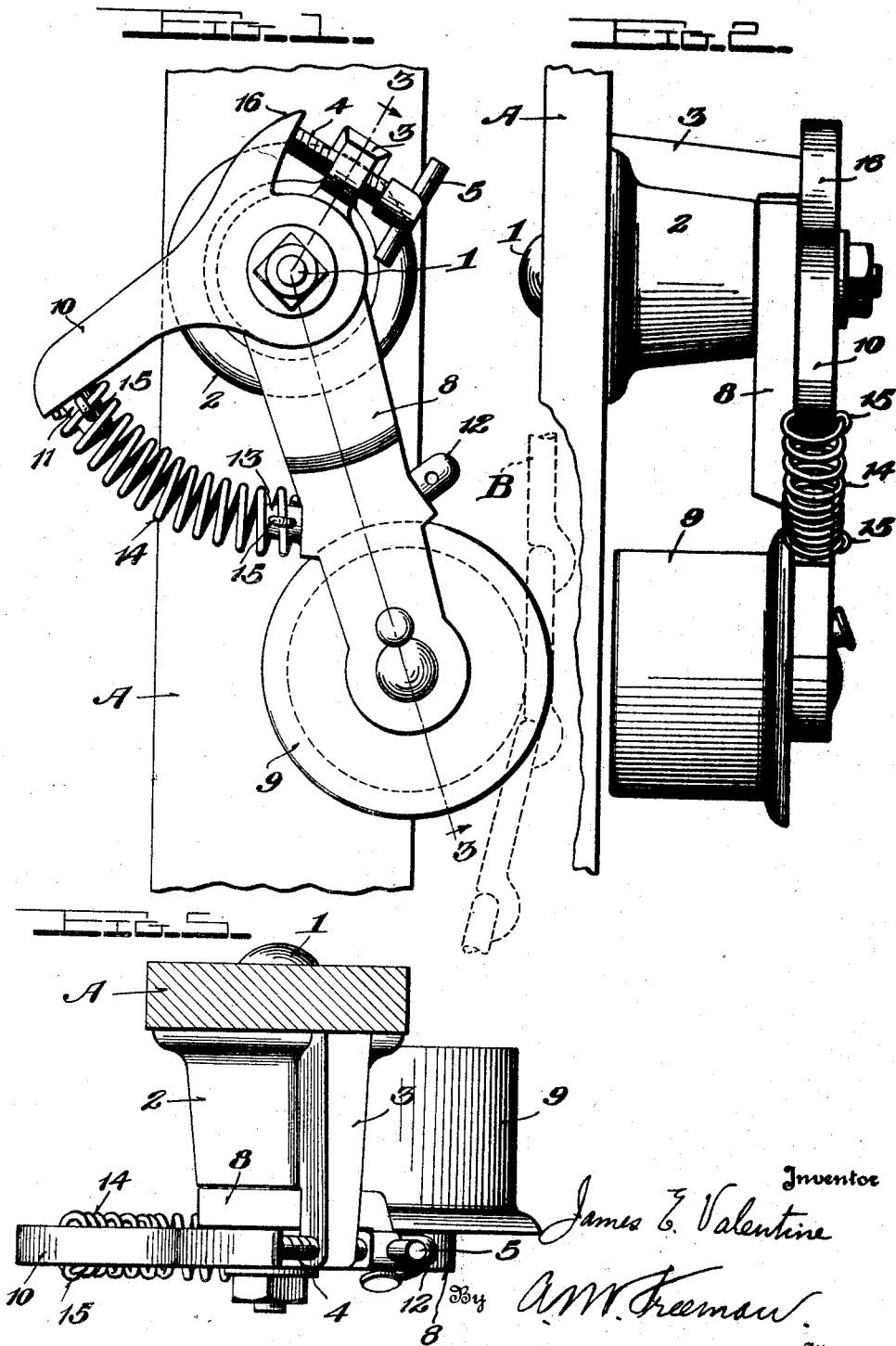

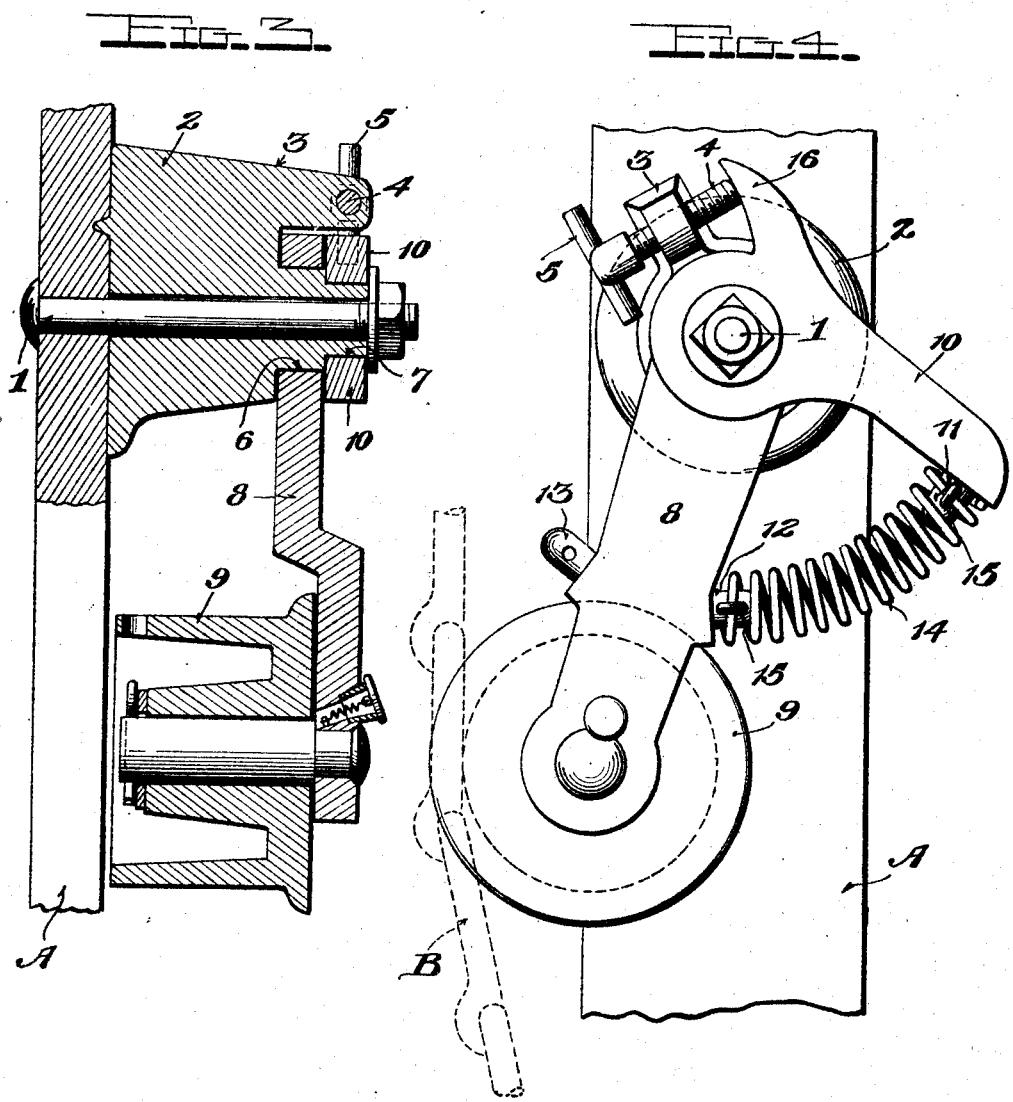

1,557,486

UNITED STATES PATENT OFFICE.

JAMES E. VALENTINE, OF EGAN, SOUTH DAKOTA.

BELT TIGHTENER.

Application filed November 28, 1924. Serial No. 752,615.

*To all whom it may concern:*

Be it known that JAMES E. VALENTINE, a citizen of the United States, residing at Egan, in the county of Moody and State of South Dakota, has invented certain new and useful Improvements in Belt Tighteners, of which the following is a specification.

This invention relates to certain new and useful improvements in belt tighteners, and the primary object thereof is to provide a device of this character which is of simplified construction, and which also is capable of being easily and quickly reversed so as to enable same to be applied to either right or left use on one belt flight, or to be applied to either flight of the belt.

A further object of the invention is to provide a belt tightener which embodies a minimum of parts which are compactly assembled; which are of strong and durable construction and which are not subject to derangement under normal conditions of use.

A still further object of the invention is to provide improved and simplified spring means for tensioning the belt, which means can be easily and quickly adjusted to vary the tension on the belt.

The invention has still further and other objects which will be later herein set forth and manifested in the course of the following description.

In the drawings:—

Fig. 1, is a front elevation of the invention;

Fig. 2 is a side elevation;

Fig. 3, is a section on line 3—3 of Fig. 1;

Fig. 4, is a view similar to Fig. 1, but showing the device in position for left hand use, and Fig. 5, it a top plan view of Fig. 1.

In proceeding in accordance with the present invention, A indicates any suitable part of the frame of the mechanism in connection with which the belt B is employed, the latter being shown in fragment in dotted lines. A single bolt 1 is employed upon which the entire device is mounted, the bolt being connected to the frame A and having a washer and nut thereon, which clamp a fixed collar 2 perforated to receive the bolt, against the frame.

The collar 2 is formed integral with an axial rib 3 that has a threaded opening in its outer end receiving therethrough a screw 4 having an operating handle 5 thereon.

The collar 2 has its outer end portion reduced in diameter and stepped to form bearings 6 and 7. An arm 8 having an offset outer end is pivotally mounted at its inner end on the bearing 6 and rotatably carries a belt engaging pulley 9 on its outer end. A second arm 10 is pivotally mounted at its inner end on the bearing 7 while its outer end has a boss 11. The arm 8 carries a similar pair of opposed bosses 12 and 13, while a coil spring 14 has its ends received over the boss 11 and one of the bosses 12 and 13 and is removably secured thereto by cotter pins 15.

The spring 14 maintains the arm 8 and thereby the pulley 9 under constant tension, and in order to adjust the tension, the arm 10 is formed with a finger or lug 16 against which the free end of the screw 4 engages. It will thus be apparent that by adjustment of the screw 4, the divergent relationship between arms 8 and 10 may be varied to increase or decrease the spring tension.

In event of it being desired or necessary to change the device from right to left use or vice versa, and as shown in Figs. 1 and 4, it is merely necessary to remove the nut of bolt 1, turn the collar slightly, then remove the screw, arm 10 and the spring with its cotter pin, and reverse or turn the arm 10 over; thread the screw into rib 3 from the opposite side thereof and then connect the spring to the lug 11 of arm 10 and to whichever of the bosses 12 or 13 confronts the boss 11, according to whether the device is being used left or right.

From the foregoing it will be apparent that the several arms and collar can be constructed of stout castings or steel stampings, and in addition thereto, the device includes but the screw and spring, thus providing a structure which embodies a minimum of parts that are compactly assembled and which operate in a small sphere so as to afford positive and certain operation.

It will further be noted that the single bolt serves to not only secure the collar to the frame, but also serves to hold each of the two arms on the collar.

What is claimed is:—

1. In a belt tightener, a collar having stepped bearings on its outer end and having an axial rib formed with a threaded perforation, an arm mounted on the inner bearing and having a belt-engaging pulley thereon, oppositely disposed bosses on said arm, a second arm mounted on the other bearing and having a boss confronting the first arm, a lug on the second arm disposed opposite to the rib perforation, a screw threaded through the rib perforation and engaged with the lug, a coil spring, and means to removably connect the spring ends to the boss of the second arm and to the adjacent boss of the first arm.

2. In a belt tightener, a support, a pivoted arm of symmetrical shape on the support having belt-engaging means, independent spring engaging means on the opposed sides of the arm, a reversible arm on the support, spring means connected to the reversible arm and interchangeably engageable with either of the said spring engaging means of the pivoted arm, reversible means carried by the support to effect adjustment of the reversible arm in either position thereof, and means to mount the reversible arm to permit of reversal thereof without disturbing the pivoted arm.

3. In a belt tightener, a support having a threaded projection, a pivoted arm on the support having independent spring engaging means on its opposite sides, a reversible arm on the support, spring means connected at one end to the reversible arm and interchangeably engageable with either of the said spring engaging means of the pivoted arm at its opposite end, a reversible screw carried by the projection of the support to engage and effect adjustment of the reversible arm in either position thereof and means to mount the reversible arm to permit of reversal thereof without disturbing the pivoted arm.

4. In a belt tightener, a collar having a projection formed with a threaded perforation, an arm pivotally mounted on the collar and having a belt-engaging pulley thereon, oppositely disposed bosses on said arm, a second arm pivotally mounted on the collar and having a boss confronting the first arm, a lug on the second arm disposed opposite to the projection of the collar, a screw threaded through the projection and engaged with the lug, a coil spring, and means to removably connect the spring ends to the boss of the second arm and to the adjacent boss of the first arm.

In testimony whereof I affix my signature.

JAMES E. VALENTINE.